(12) United States Patent
Tomizawa et al.

(10) Patent No.: US 8,077,425 B2
(45) Date of Patent: Dec. 13, 2011

(54) MAGNETIC DISK APPARATUS AND INFORMATION REPRODUCING METHOD

(75) Inventors: Yasushi Tomizawa, Tokyo (JP);
Kohsuke Harada, Kanagawa (JP);
Hiroaki Nakamura, Kanagawa (JP);
Yoshiyuki Ishihara, Kanagawa (JP);
Shinji Takakura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 138 days.

(21) Appl. No.: 12/542,100

(22) Filed: Aug. 17, 2009

(65) Prior Publication Data

US 2010/0079910 A1   Apr. 1, 2010

(30) Foreign Application Priority Data

Sep. 26, 2008   (JP) .................................. 2008-248461

(51) Int. Cl.
*G11B 21/02*   (2006.01)
(52) U.S. Cl. ............. 360/75; 360/110; 360/135; 360/48
(58) Field of Classification Search ........................ None
See application file for complete search history.

(56) References Cited

U.S. PATENT DOCUMENTS

| | | | | |
|---|---|---|---|---|
| 6,977,108 | B2 * | 12/2005 | Hieda et al. | 428/64.2 |
| 2009/0103203 | A1 * | 4/2009 | Yoshida | 360/75 |

FOREIGN PATENT DOCUMENTS

| | | |
|---|---|---|
| JP | 10-233063 | 9/1998 |
| JP | 2003-151103 | 5/2003 |
| JP | 2006-048920 | 2/2006 |
| JP | 2006-338691 | 12/2006 |
| JP | 2007-073116 | 3/2007 |
| JP | 2007-128572 | 5/2007 |

* cited by examiner

*Primary Examiner* — Jason Olson
(74) *Attorney, Agent, or Firm* — Turocy & Watson, LLP

(57) ABSTRACT

A magnetic disk apparatus includes a magnetic disk that includes a plurality of zones in which a plurality of tracks are arranged for each of circumferences of a spiral, and gaps that are arranged between the zones to have a width a predetermined number of times larger than a track width and that are regions without providing recording bits; and a reproducing element that simultaneously makes an access to the recording bits contained in the tracks, reading information stored in the recording bits, wherein the number of the tracks is one or larger and a sum of one and the predetermined number or smaller in one of the zones.

13 Claims, 3 Drawing Sheets

ENLARGED VIEW OF TRACKS

MAGNETIC DISK APPARATUS AND INFORMATION REPRODUCING METHOD

CROSS-REFERENCE TO RELATED APPLICATIONS

This application is based upon and claims the benefit of priority from the prior Japanese Patent Application No. 2008-248461, filed on Sep. 26, 2008; the entire contents of which are incorporated herein by reference.

BACKGROUND OF THE INVENTION

1. Field of the Invention

The present invention relates to a magnetic disk apparatus and an information reproducing method.

2. Description of the Related Art

With rapid improvements in the recent information processing technology, a higher recording density of a recording medium on a magnetic disk apparatus and a higher speed of recording data in the medium have been strongly demanded. For example, controlling technologies for accurate positioning of the head have been developed to improve the recording density, and bit-patterned media technologies have been developed to solve a heat fluctuation problem that arises from the reduced recording bit size.

To increase the speed of recording data onto the recording medium, JP-A H10-233063 (KOKAI) suggests a technology of arranging zones having concentric or helical tracks with respect to the center of rotation in a magnetic recording medium and providing each zone with an alternative track. With this technology, even when a defective sector appears, a magnetic disk that does not require long time in accessing data can be offered.

JP-A 2007-73116 (KOKAI) discloses a technology of designing the core of the magnetic recording head to have a width larger than a track width and recording data by sliding the magnetic head by a track pitch in the track width direction to increase the recording density of a patterned medium.

The above two documents, however, do not touch upon an operation of reproducing information from recording bits by making an access to more than one track. If the width of the reproducing element of a magnetic head is greater than the width of a track, the value acquired through an access is the sum of values recorded in several recording bits. For this reason, a process needs to be executed to retrieve individual values of the recording bits from the acquired value. In an effort to realize high-speed processing of this operation, a suitable arrangement of recording bits on a magnetic disk has been a problem to be solved.

SUMMARY OF THE INVENTION

According to one aspect of the present invention, a magnetic disk apparatus, includes a magnetic disk that includes a plurality of zones in which a plurality of tracks are arranged for each of circumferences of a spiral, and gaps that are arranged between the zones to have a width a predetermined number of times larger than a track width and that are regions without providing recording bits; and a reproducing element that simultaneously makes an access to the recording bits contained in the tracks, reading information stored in the recording bits, wherein the number of the tracks is one or larger and a sum of one and the predetermined number or smaller in one of the zones.

According to another aspect of the present invention, an information reproducing method implemented in a magnetic disk that includes a plurality of zones in which a plurality of tracks are arranged for each of circumferences of a spiral, and gaps that are arranged between the zones to have a width a predetermined number of times larger than a track width and that are regions without providing recording bits, the method includes making simultaneously an access to the recording bits contained in the tracks, reading information stored in the recording bits, wherein the number of the tracks is one or larger and a sum of one and the predetermined number or smaller in one of the zones.

DETAILED DESCRIPTION OF THE INVENTION

First, the relationship between an increase in the recording density of a magnetic disk apparatus and a decrease in the information transferring speed is explained before discussion of the present embodiment.

To increase the recording density of a magnetic disk apparatus, both bits per inch (BPI) and tracks per inch (TPI) need to be increased. For a conventional magnetic disk apparatus, the bit aspect ratio (BAR) between the BPI and the TPI is approximately 10:1, which means that the density in the BPI direction is denser. If a bit patterned media (BPM) is to be adopted, which is essential to achieve a 1 T bits per square inch level recording density, it is reported that, due to the structure of the medium, the TPI needs to be increased to bring the BAR to 4:1.

To raise the TPI, the head positioning accuracy has to be increased, and moreover, the width of the head element for recording and reproducing has to be reduced. Thus, the accuracy of positioning and the width of the head are traded off for each other. Furthermore, a higher TPI with respect to the BPI means that the number of seeks for adjacent tracks is increased during sequential reading/writing. This would comparatively lower the information transferring speed of the magnetic disk apparatus.

The present embodiments are now explained below with reference to the drawings.

The structure of a magnetic disk apparatus and a data accessing method according to an embedment of the present invention are described below. The magnetic disk apparatus according to the present embodiment is of a hybrid style provided with a non-volatile memory such as a NAND flash memory or the like. Characteristically, the non-volatile memory has a greater capacity (several times to several tens of times greater) than a storage capacity per zone of the magnetic disk.

The non-volatile memory may be a NAND flash memory, a resistance random access memory (ReRAM), a phase change RAM (PRAM), a magnetoresistive random access memory (MRAM), or a FeRAM (ferroelectric random access memory).

The non-volatile memory incorporated in the magnetic disk apparatus according to the present embodiment realizes a function of a cache for a magnetic disk drive. Small files and frequently accessed files are stored in this non-volatile memory, and then subjected to a read/write operation by an external device outside the magnetic disk apparatus. On the other hand, massive files such as motion pictures are directly read from and written into the magnetic disk apparatus. Furthermore, when less frequently accessed files that are stored in the non-volatile memory reach a certain amount, these files are written altogether into a magnetic disk.

Figure 1:
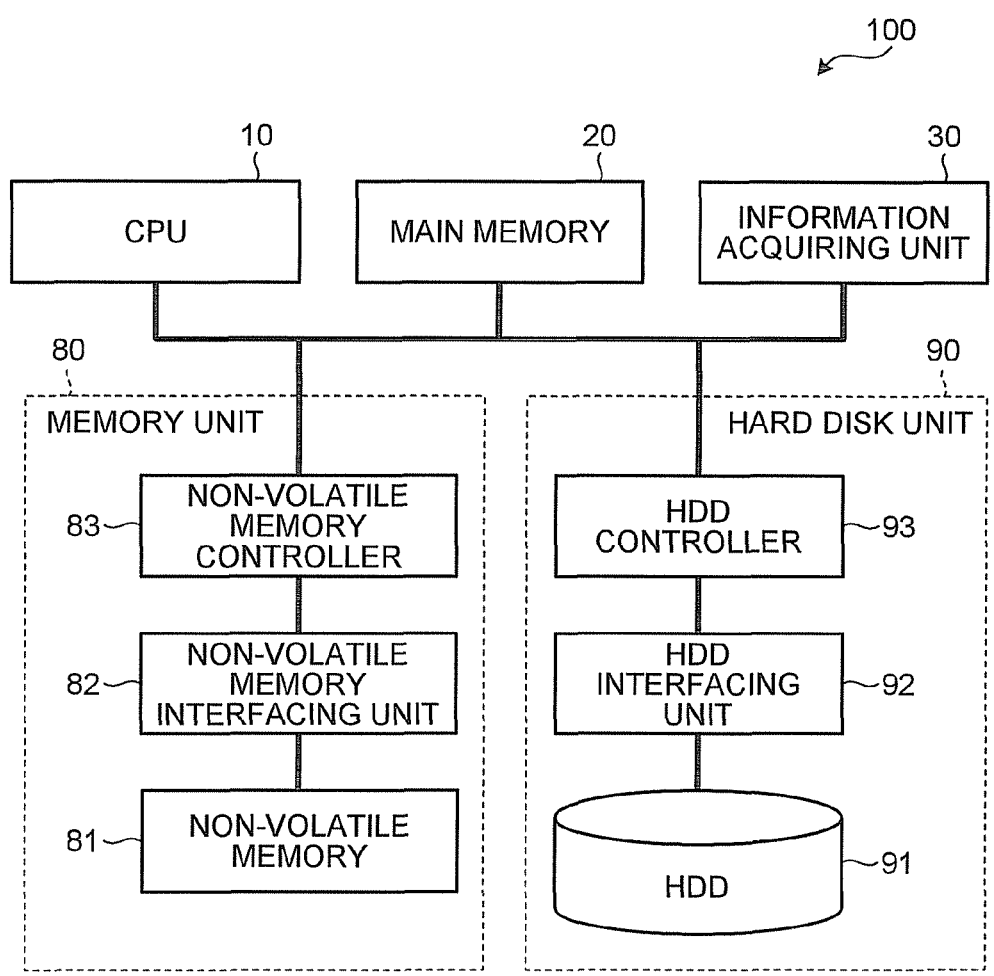
FIG. 1 is a block diagram for showing a functional structure of a magnetic disk apparatus according to an embodiment of the present invention.

A magnetic disk apparatus 100 illustrated in FIG. 1 includes a CPU 10, a main memory 20, an information acquiring unit 30, a memory unit 80, and a hard disk unit 90. The CPU 10 executes a program expanded on the main memory 20 or the like to control the units of the magnetic disk apparatus 100.

The main memory 20 temporarily stores therein the data transferred between the hard disk unit 90 and the memory unit 80. Programs implemented by the CPU 10 may also be stored in the main memory 20. The information acquiring unit 30 acquires data of each recording bit recorded on the magnetic disk, based on the value of a signal read from the hard disk unit 90.

The memory unit 80 includes a non-volatile memory 81, a non-volatile memory interfacing unit 82, and a non-volatile memory controller 83. The non-volatile memory 81 stores therein data read from the magnetic disk. The recording capacity of the non-volatile memory 81 corresponds to the amount of data read from the magnetic disk and is greater than the size of data in a zone of the magnetic disk.

The non-volatile memory interfacing unit 82 offers an interface when the non-volatile memory controller 83 is making an access to the non-volatile memory 81. The non-volatile memory controller 83 reads data from the non-volatile memory 81, and writes data into the non-volatile memory 81.

The hard disk unit 90 includes a hard disk drive (HDD) 91, a HDD interfacing unit 92, and a HDD controller 93. The HDD 91 includes a magnetic disk according to the present embodiment, a magnetic head that acquires signal values from the recording bits on the magnetic disk, and a driving unit that drives the magnetic disk and the magnetic head.

The HDD interfacing unit 92 offers an interface when the HDD controller 93 is making an access to the HDD 91. The HDD controller 93 reads data from the HDD 91, and writes data into the HDD 91.

Figure 2A:
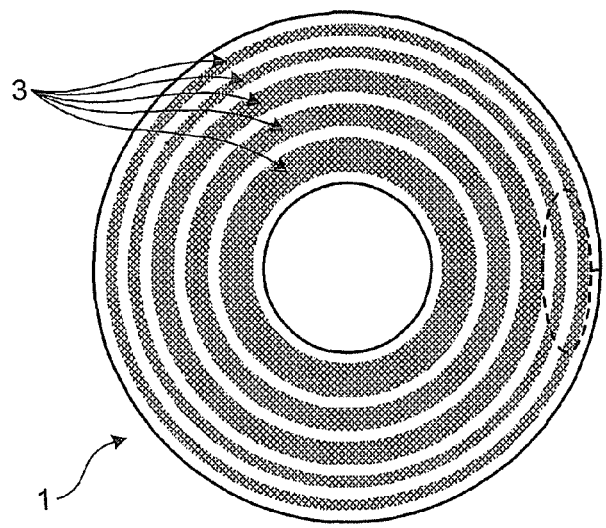
FIGS. 2A and 2B are diagrams of a format structure of a magnetic disk 1 included in the magnetic disk apparatus.

The recordable region on the disk surface of the magnetic disk 1 illustrated in FIG. 2A is divided into zones 3 each having a certain capacity. The capacity of each zone may be several gigabytes. The zones are separated by a portion with no data written in. This no-data portion is called "gap". The recording bits in each zone are contained in tracks that run in the form of a spiral from the outer edge of the disk to the inner circumference. Thus, all the data in the zones can be continuously read and written without a single seek operation.

Figure 2B:
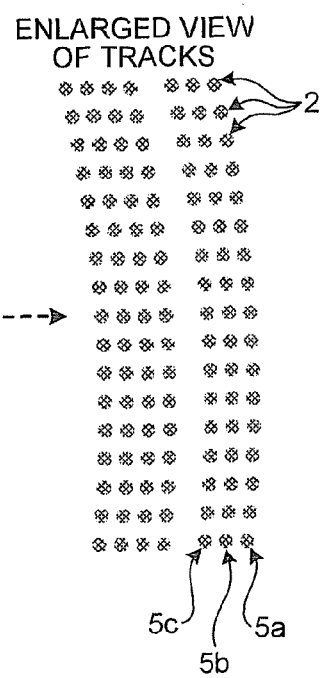

FIG. 2B is a diagram for explaining part of the detailed format of the zones. Tracks 5a to 5c are pseudo-concentric along the outer rim of the magnetic disk 1, and the tracks continue as a spiral. In particular, one lap of the spiral corresponds to one track. In this manner, recording bits 2 are arranged from the outermost track to the innermost track.

Index signals required for data accessing are positioned in a leading portion of tracks that form a zone. For this reason, a data access is made always by each zone, and a random access by each cylinder as can be made in a conventional magnetic disk is not allowed.

According to format structure in FIGS. 2A and 2B, the magnetic disk 1 does not perform any seek operation when reading and writing data in a zone. Hence, when successively recording or reproducing large-volume files, the access speed is much higher than that of the conventional magnetic disk apparatus.

The magnetic disk apparatus according to the present embodiment may be an apparatus of a super high recording density as high as, or higher than, 1 T bits per square inch. In such a super-high-density magnetic disk apparatus, the capacity becomes 1 terabyte or greater with a 2.5-inch drive.

With a hard disk device having a flash memory of several gigabytes to tens of gigabytes therein, motion picture data or archive data larger than several gigabytes can be recorded and reproduced faster than in a device of a random-access type.

When preparing a father stamper used for BPM formation by electronic beam drawing, technical problems arise in drawing a concentric recording bit pattern, due to errors in stage feed accuracy, and therefore the writing start of a track may not meet the writing end. Thus, by making the tracks in a spiral, such problems in drawing can be prevented.

The width of a read element of the magnetic head incorporated in a conventional magnetic disk apparatus is equal to or smaller than a track width. In such an arrangement, information of only one track can be read out, preventing information on adjacent tracks from being picked up as noise.

Figure 3:
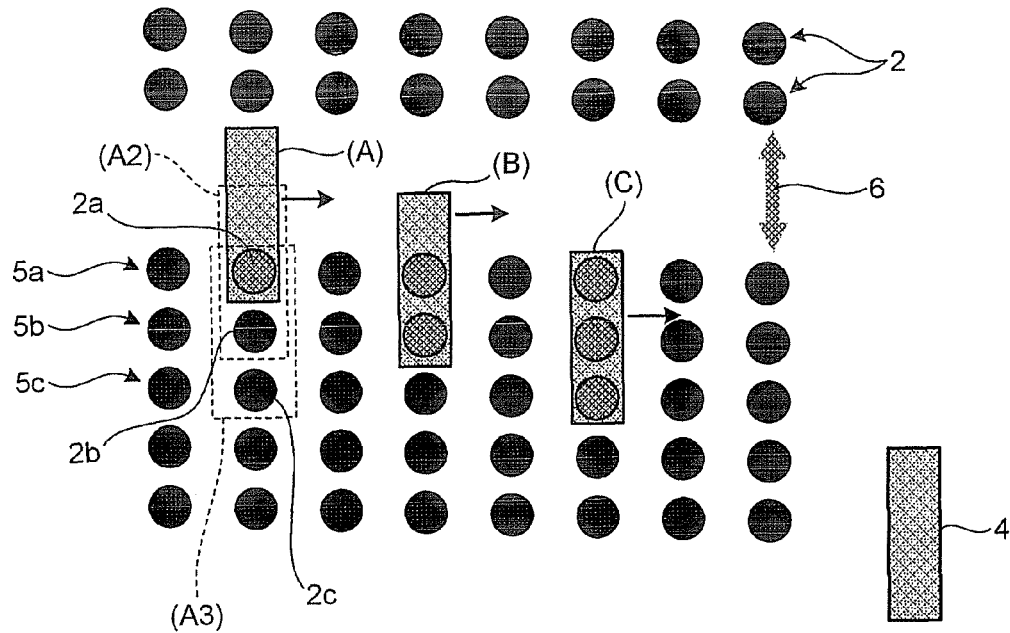
FIG. 3 is a diagram for explaining a data read algorithm of the magnetic disk apparatus.

In the magnetic disk apparatus according to the present embodiment, the read element of the magnetic head has a width of a track multiplied by a predetermined number. With this structure, the information of recording bits across several tracks can be read out at a time. In the example of FIG. 3, the width of the read element is triple the width of a track, and three recording bits can be simultaneously read out.

At a position (A) of FIG. 3, information written in the outermost track 5a only, which is the leading portion of a zone, is read with the edge portion of the read element. The width of a gap between zones is determined to be larger than a difference between the width of the read element and the width of a track so that the edge portion on the other side of the read element would not pick up the information written in one zone out of the target zone.

The tracks in a zone are formed into a spiral. The magnetic head that starts reading data from the position (A) reaches a position (B) after making a circuit or more on the magnetic disk. At the position (B), the magnetic head reads information of both the outermost track and the track 5b that is one track in from the outmost track. When data of two recording bits is read out at a time with a single head, the sum of the signal values corresponding to the two pieces of data is output. In the magnetic disk apparatus according to the present embodiment, the information acquiring unit 30 subtracts the data of the outermost track 5a read out in the same manner as at the position (A) from the signal value read out at the position (B), so that the data of the recording bits in the second track from the outermost track at the position (B) can be retrieved.

The magnetic head moves on every recording bit, and reaches a position (C) on the third track 5c. At the position (C), the magnetic head reads the data of three recording bits on three tracks. The data of the third track can be extracted by subtracting the data of the already acquired outer two tracks from the signal value read at the position (C).

In FIG. 3, the recording bits read out at the positions (A) to (C) are different from one another for convenience of explanation. According to the present embodiment, by subtracting the value of the signal acquired at the position (A) from the value of the signal acquired from the position (A2) including a recording bit of one track in from the position (A), the data corresponding to the recording bit 2b of the second track 5b is acquired.

Furthermore, the data corresponding to a recording bit 2c of the third track 5c can be acquired by subtracting the values corresponding to the recording bits 2a and 2b from the signal value acquired at the position (A3) including a recording bit of one track in from the position (A2).

Based on a signal value acquired through one access to a recording bit of each of the tracks, a signal value recorded in one recording bit can be obtained by subtracting signal values acquired through an access to recording bits of the adjacent tracks from the acquired signal value. In this manner, the information of the target signal value can be obtained. The signal value may be further subjected to an error correction.

The data extraction method indicated in FIG. 3 is realized by a data accessing method according to the present embodiment, by which all the data in one zone is read out at a time, sequentially from the outermost track.

In the example of FIG. 3, a spiral formed by the tracks is arranged from the outer edge of the disk toward the inside. The reading operation in FIG. 3 is therefore sequentially conducted, starting from the outermost track of each zone. The structure may be such that the spiral is arranged from the inside to the outer edge in an opposite direction of FIG. 3, so that the reading operation is conducted sequentially from the innermost track of each zone.

Figure 4:
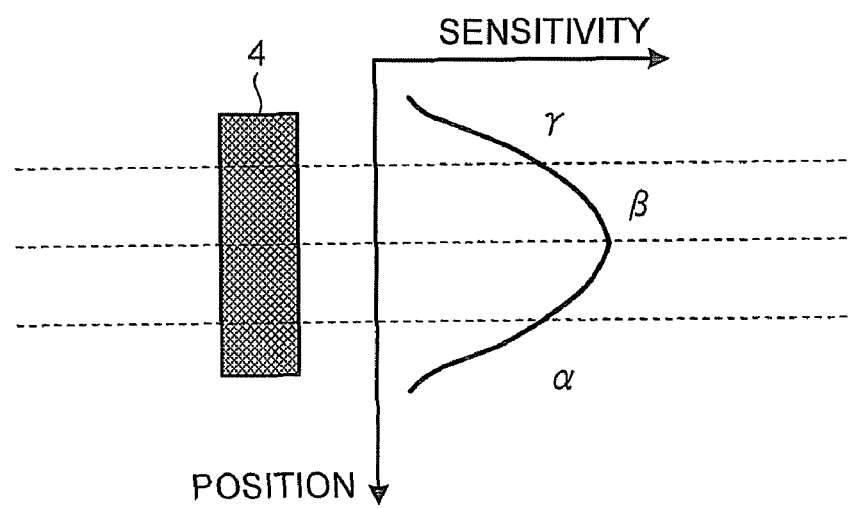
FIG. 4 is a diagram for showing a distribution of reproduction sensitivity of a read element 4 of a magnetic head in the magnetic disk apparatus.

In FIG. 4, the read element 4 has the highest reproduction sensitivity in its central portion, and the sensitivity becomes lower toward the edge portions of the read element 4. According to the present embodiment, an access is made to three recording bits at the same time. The reproduction sensitivities at the positions corresponding to the three recording bits from the inside to the outside are defined as $\alpha$, $\beta$, and $\gamma$.

With reference to FIGS. 3 and 4, the process in which the information acquiring unit 30 removes influence of data of the read-out tracks from signals read by the magnetic head is explained below in detail. In FIGS. 3 and 4, the reproducing head has a width wide enough to read information from three recording bits of different tracks at the same time.

At the position (A) of FIG. 3, the relationship of signals r1 and s1 that are acquired by reading information s1 written on the outermost track 5a is expressed by the following equation (1).

$$r1 = \alpha \times s1 \qquad (1)$$

Thus, the information s1 can be determined by the following equation (2).

$$s1 = r1/\alpha \qquad (2)$$

When the information s1 and s2 is read at a time from the outermost track 5a and the track 5b, which is one track in from the outermost track 5a, at the position (A2) in FIG. 3, the obtained signal r2 can be expressed by the following equation (3).

$$r2 = \alpha \times s2 + \beta \times s1 \qquad (3)$$

Hence, the information s2 can be determined by the following equation (4).

$$s2 = (r2 - \beta \times s1)/\alpha = (r2 - \beta \times r1/\alpha)/\alpha \qquad (4)$$

Because r1 is a raw signal detected by the reproducing head in the reading operation, it contains noise components generated during the detection. For this reason, when r1 is incorporated in the equation (4) to calculate s2, the influence of the noise may be expanded.

Thus, the signal s1 obtained by the equation (2) is once demodulated into data strings, and the strings are modulated again into a signal s1'. In accordance with the following equation (5) incorporating the signal s1', the influence of noise can be suppressed during the reproduction.

$$s2 = (r2 - \beta \times s1')/\alpha \qquad (5)$$

Because s1' is an ideal signal that does not contain any noise components, the signal s2 obtained by the equation (5) reduces the influence of noise in a greater deal during the reproduction than the signal s2 obtained by the equation (4).

In a similar manner, a signal obtained when reading information up to s3 written in the outer three tracks at the position (A3) in FIG. 3 can be expressed by the following equation (6).

$$r3 = \alpha \times s3 + \beta \times s2 + \gamma \times s1 \qquad (6)$$

Hence, the information s3 written in the track 5c, which is three tracks in from the outermost track, can be determined by the following equation (7).

$$s3 = (r3 - \beta \times s2 - \gamma \times s1)/\alpha = (r3 - \beta(r2 - \beta \times r1/\alpha)/\alpha - \gamma \times r1/\alpha)/\alpha \qquad (7)$$

In the same manner as in the equation (5), the influence of noise can be reduced during the reproduction in accordance with the following equation (8) incorporating a signal s2' that is obtained by modulating and demodulating the signal s2.

$$s3 = (r3 - \beta \times s2' - \gamma \times s1')/\alpha \qquad (8)$$

As for any track inside the outer three tracks, the signal of the innermost one of the simultaneously accessed recording bits can be calculated by substituting the already calculated signals of the closest two tracks into the equation (7) or (8).

According to the present embodiment, the magnetic head that reads signals across three tracks is dealt with as an example. The present embodiment, however, is not limited thereto, and regardless of the number of recording bits that are read at a time, signals of recording bits can be separated from one another in accordance with the same algorithm.

Figure 5:
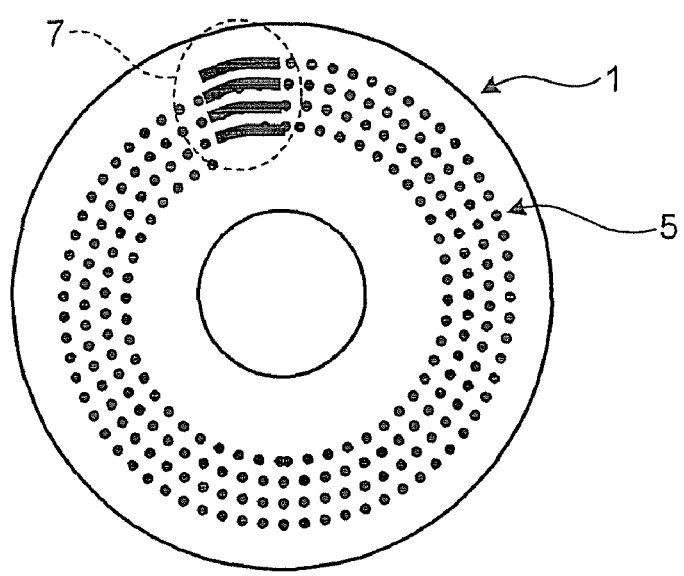
FIG. 5 is a diagram for explaining a sync pattern that distinguish tracks in a zone.

In FIG. 5, sync patterns 7 are in phase in the radius direction on the disk, and are defined as separators of tracks. With this arrangement, when using the above algorithm, the spirally connected tracks can be separated from one another in a concentric manner, and the start and end points of the tracks can be clearly determined.

As mentioned at the outset, there is a trade off, in an effort to improve the TPI, between the reduction of the width of the head element for recording and reproducing and the improvement of the precision of positioning the head. By widening the head to a width large enough to be laid across more than one track, the positioning precision can be maintained at a sufficient level, and the recording density can be readily improved.

For a servomechanism for positioning the magnetic head, a sector servo may be adopted. The mechanism may be a continuous servo as described in JP-A 2006-48920 (KOKAI), because the tracks of the present embodiment are formed into a spiral.

On the other hand, in the magnetic disk apparatus in which the tracks of the recording bits are formed into a spiral, if the magnetic head follows the tracks during idle time, the head is shifted inside along the tracks. To prevent this from happening, the head needs to be held on a concentric circle of the disk, while reading a servo signal provided in the form of a spiral. Thus, a technology described in the JP-A 2007-128572 (KOKAI) may be adopted.

The present embodiment offers a magnetic disk apparatus and an information processing method that can improve the recording density of the magnetic disk and also increase the speed of reproducing the recorded information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk apparatus, comprising:
a magnetic disk that includes
a plurality of zones in which a plurality of tracks are arranged for each of circumferences of a spiral, and
gaps that are arranged between the zones, the gaps being regions without providing recording bits; and
a reproducing element that reads information stored in the recording bits,
a width of each of the gaps between the zones is larger than a difference between a width of the reproducing element and a width of a track, and
the width of the reproducing element is equal to or larger than two times the width of the track and the reproducing element simultaneously reads information of the recording bits across equal to or larger than two times the number of the tracks.

2. The apparatus according to claim 1, wherein the reproducing element makes an access sequentially from an outermost track to inner tracks of the magnetic disk in the zone, when the tracks are arranged in form of a spiral from an outer edge of the magnetic disk to an inner circumference thereof.

3. The apparatus according to claim 1, wherein the reproducing element makes an access sequentially from an innermost track to outer tracks of the magnetic disk in the zone, when the tracks are arranged in form of a spiral from an inner edge of the magnetic disk to an outer circumference thereof.

4. The apparatus according to claim 2, further comprising an information acquiring unit that acquires information recorded in a recording bit of a second track from the outermost track, by calculating a difference between a value acquired by the reproducing element when accessing only a recording bit of the outermost track in the zone, and a value acquired by the reproducing element when accessing recording bits of the outermost track and the second track.

5. The apparatus according to claim 3, further comprising an information acquiring unit that acquires information recorded in a recording bit of a second track from the innermost track, by calculating a difference between a value acquired by the reproducing element when accessing only a recording bit of the innermost track in the zone, and a value acquired by the reproducing element when accessing recording bits of the innermost track and the second track.

6. The apparatus according to claim 4, wherein the information acquiring unit acquires information recorded in the recording bit of a track adjacent to the tracks by calculating a difference between a first access value and an adjacent access value, where the first access value denoting a value acquired by the reproducing element when making an access to the recording bits contained in each of the tracks, and the adjacent access value denoting a value acquired by the reproducing element when making an access to recording bits that includes one or more of the recording bits within the recording bits contained in each of the tracks and a recording bit contained in the track adjacent to the tracks.

7. The apparatus according to claim 5, wherein the information acquiring unit acquires information recorded in the recording bit of a track adjacent to the tracks by calculating a difference between a first access value and an adjacent access value, where the first access value denoting a value acquired by the reproducing element when making an access to the recording bits contained in each of the tracks, and the adjacent access value denoting a value acquired by the reproducing element when making an access to recording bits that includes one or more of the recording bits within the recording bits contained in each of the tracks and a recording bit contained in the track adjacent to the tracks.

8. The apparatus according to claim 6, wherein the first access value is a value acquired by making an error correction to a signal value acquired by the reproducing element.

9. The apparatus according to claim 7, wherein the first access value is a value acquired by making an error correction to a signal value acquired by the reproducing element.

10. The apparatus according to claim 4, further comprising a controlling unit that controls the reproducing element and the information acquiring unit in such a manner that information recorded in all the recording bits included in the zone is sequentially retrieved for each of the zones.

11. The apparatus according to claim 5, further comprising a controlling unit that controls the reproducing element and the information acquiring unit in such a manner that information recorded in all the recording bits included in the zone is sequentially retrieved for each of the zones.

12. The apparatus according to claim 1, further comprising an interface to a non-volatile memory that stores information recorded in all the recording bits included in the zone.

13. An information reproducing method implemented in a magnetic disk that includes a plurality of zones in which a plurality of tracks are arranged for each of circumferences of a spiral, and gaps that are arranged between the zones the gaps being regions without providing recording bits, the method comprising:
reading information stored in the recording bits, wherein
a width of each of the gaps between the zones is larger than a difference between a width of the reproducing element and a width of a track, and
the width of the reproducing element is equal to or larger than two times the width of the track and the reproducing element simultaneously reads information of the recording bits across equal to or larger than two times the number of the tracks.

* * * * *